US006885130B2

(12) United States Patent
Faltin

(10) Patent No.: US 6,885,130 B2
(45) Date of Patent: Apr. 26, 2005

(54) EFFICIENT MOTOR WITH DUAL CYLINDRICAL MAGNETS AND ROTOR ARM COILS

(76) Inventor: Henry Faltin, 10303-111 Avenue, Fort St. John, B.C. (CA)

( * ) Notice: Subject to any disclaimer, the term of this patent is extended or adjusted under 35 U.S.C. 154(b) by 77 days.

(21) Appl. No.: 10/639,437

(22) Filed: Aug. 13, 2003

(65) Prior Publication Data

US 2005/0035681 A1 Feb. 17, 2005

(51) Int. Cl.⁷ ............................................... H02K 1/22
(52) U.S. Cl. ...................................... 310/268; 310/267
(58) Field of Search ......................... 310/261, 267–268, 310/233, 239, 254

(56) References Cited

U.S. PATENT DOCUMENTS

| | | | | | |
|---|---|---|---|---|---|
| 4,068,143 | A | * | 1/1978 | Whiteley | 310/268 |
| 4,188,556 | A | * | 2/1980 | Hahn | 310/268 |
| 4,605,873 | A | * | 8/1986 | Hahn | 310/154.06 |
| 5,892,307 | A | * | 4/1999 | Pavlovich et al. | 310/68 B |

* cited by examiner

Primary Examiner—Thanh Lam

(57) ABSTRACT

A motor in which dual permanent magnets in addition to the field magnets are positioned to do most of the work in magnetizing the rotor of a motor and coils on the rotor to supplement and focus the magnetic polarization. The amount of electricity required to run the motor is less than with other permanent magnet-assisted motors and considerably less than with standard electric motors. A top permanent cylindrical magnet is held in place by a top end-plate on a housing around a rotor, and a bottom permanent cylindrical magnet is held in place by a bottom end-plate the housing below the rotor, the rotor being rotatable on an axle aligned with an axis of the top cylindrical magnet and of the bottom cylindrical magnet, by which sections of the rotor are in turn magnetized with a polarity matching the top-to-bottom aligned polarity of the top and bottom permanent magnets, and individual inductive wire coils being wound around a portion of a plurality of rotor arms radiating from a rotor axle, the portion being adjacent to an end of each respective rotor arm, the coils being arranged as in an armature of a direct current electric motor, electrified through a commutator and brushes such that the coils produce the same magnetic polarity in the rotor overall as is produced in the rotor by the top and bottom permanent magnets.

7 Claims, 3 Drawing Sheets ured force is<br>
EFFICIENT MOTOR WITH DUAL CYLINDRICAL MAGNETS AND ROTOR ARM COILS

FIELD OF THE INVENTION

This invention relates to motors in which multiple magnets are used to reduce friction, enhance magnetic fields, and render more efficient the operation of an electric motor.

BACKGROUND OF THE INVENTION

An electric motor has six basic parts: an axle, at least one field magnet surrounding at least in part the rotor in its plane of rotation, commutator bars, a battery in the case of a direct current motor or an alternating current power supply in the case of an AC motor, brushes, and an armature.

The motor will turn due to the creation of magnetic forces at the ends of the armature that oppose those of the field magnet. The armature is an electromagnet made by wrapping wire around a metallic core. Each side of the armature is wrapped by an independent coil of wire, one connected to a first commutator bar, the other connected to the other commutator bar.

The armature and commutator bars are attached to the axle and spin around with the axle when power is supplied to motor from the power supply via the respective positive and negative electrical contact brushes, which are stationary with respect to the axle. The brushes by turn contact with the commutator bars which then polarize the coils on the opposite sides of the armature. Initially the positive end of the field magnet is aligned with the coil that has the positive polarity and the negative side of the field magnet is aligned with the coil that has the negative polarity. The repelling like forces cause the armature to rotate on the axle along with the commutator bars.

When the commutator bars rotate far enough, the brushes contact the respective commutator bars, which reverses the polarization on each coil so that the repelling force is renewed after the armature has turned 180 degrees, forcing a continuing rotation of the armature on the axle.

It is possible to use an electomagnet in place of a single or double field magnet for the motor, allowing an increase of current to the electromagnet and to the brushes, to provide control or increased magnetic field strength on demand when more rotational force is required from the motor.

There exist direct current motors utilizing permanent magnets to affect the operation of the rotor within the motor. A prime use of permanent magnets is to facilitate brushless DC motors. Permanent magnets can be placed perpendicular to the magnetic field of the main magnets of a rotor or stator to increase the flux density of the main magnets in a motor.

SUMMARY OF THE INVENTION

In the present invention, dual permanent magnets in addition to the field magnets are positioned to do most of the work in magnetizing the rotor of a motor and coils on the rotor to supplement and focus the magnetic polarization. The amount of electricity required to run the motor is less than with other permanent magnet-assisted motors and considerably less than with standard electric motors.

In a preferred embodiment, the motor comprises:

a) a top permanent cylindrical magnet held in place by a top end-plate on a housing around a rotor, and a bottom permanent cylindrical magnet held in place by a bottom end-plate the housing below the rotor, the rotor being rotatable on an axle aligned with an axis of the top cylindrical magnet and of the bottom cylindrical magnet, by which sections of the rotor are in turn magnetized with a polarity matching the top-to-bottom aligned polarity of the top and bottom permanent magnets;

b) individual inductive wire coils wound around a portion of a plurality of rotor arms radiating from a rotor axle, the portion being adjacent to an end of each respective rotor arm, the coils being arranged as in an armature of a direct current electric motor, electrified through a commutator and brushes such that the coils produce the same magnetic polarity in the rotor overall as is produced in the rotor by the top and bottom permanent magnets;

As each section of the rotor passes between the south oriented magnetic polarities of the top and bottom permanent rotor magnets, that section becomes magnetized with a south oriented magnetic polarity. The corresponding coil on the rotor supplements and focuses the south magnetic polarization, which is then attracted by the north oriented magnetic polarity of the permanent field magnets that surround at least in part the rotor in its plane of rotation, just as with any electric motor. The same effect takes place but with opposite polarities as the section of the rotor then passes between the north pole of the top and bottom permanent rotor magnets.

The efficiency of the motor in operation is enhanced by having a greater number of arms with coils, at the cost of increased material complexity of construction, limited by the thickness required given the inherent strength of the metal used for each arm. A useful balance between electrical efficiency for the motor and common metal construction for a typical motor would be to have approximately twenty-two arms forming the rotor in an equidistant radiant formation.

The adjustments of the rotor magnets could be made with shims which are placed between the housing and the end-plates or by having screw-on end-plates, with which adjustments would be made by screwing the end plates one way or the other. If precision machining is done, the adjustment would not be necessary.

DETAILED DESCRIPTION

Figure 1:
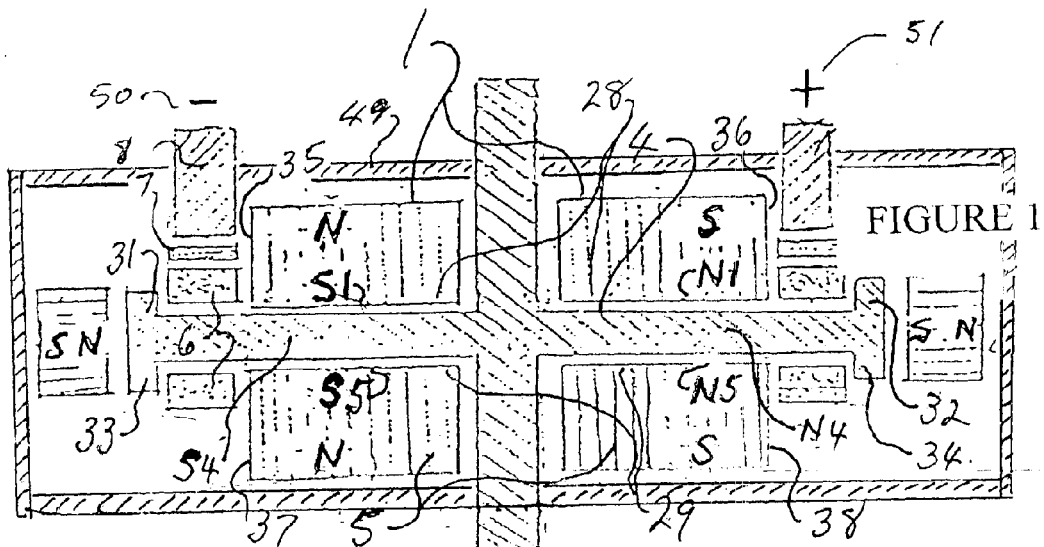
FIG. 1 is a side cross-sectional representation of the device of the present invention.
Figure 6:
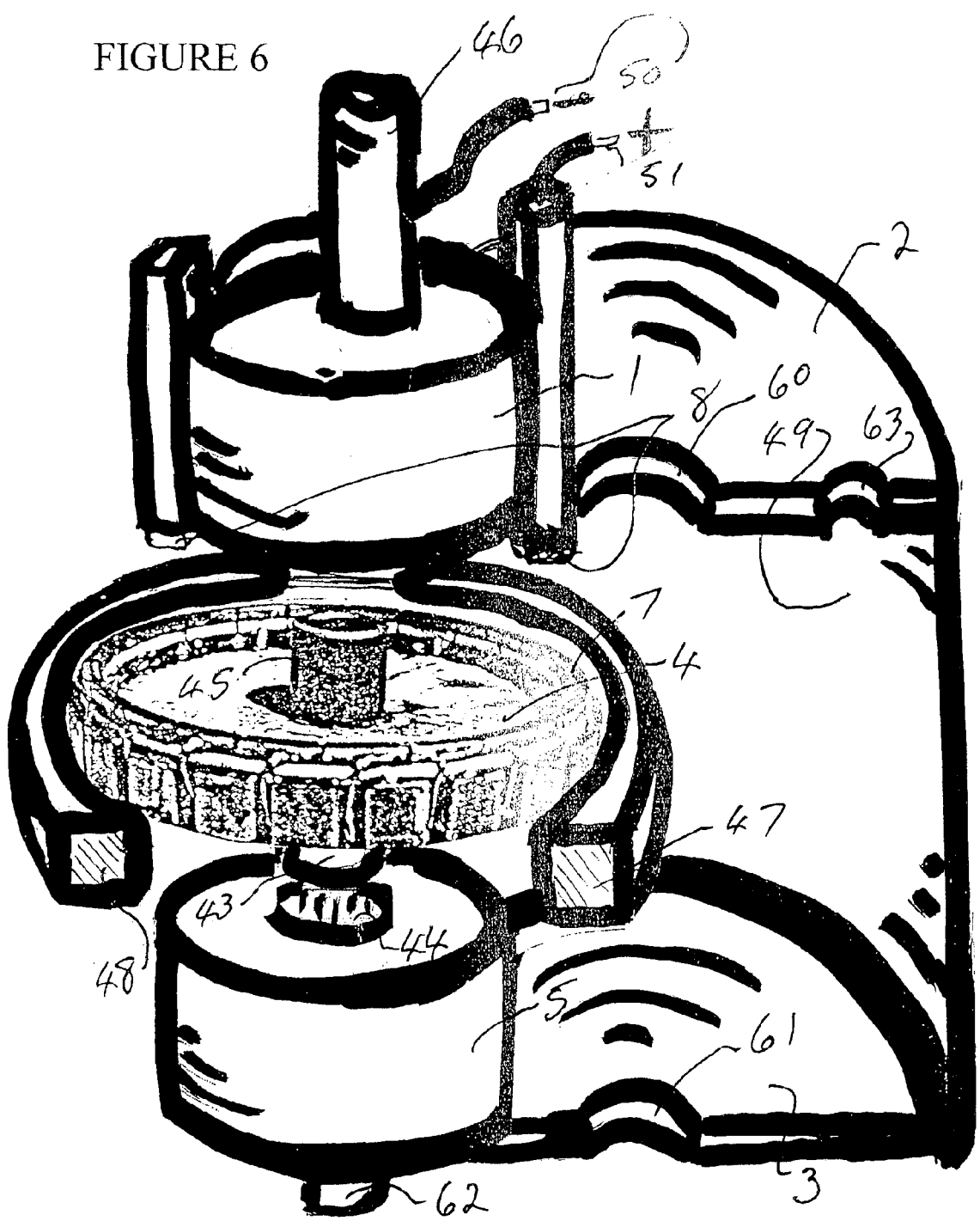
FIG. 6 is an exploded side perspective view of the device of FIG. 3.

Referring to FIGS. 1 and 6, there is a top permanent rotor magnet 1 which would be held in place by a top end-plate 2 on a housing 49, the top axle 46 fitting within the upper axle indent 60 and the positive terminal 51 fitting within terminal indent 63. Below the rotor 4 is a bottom permanent rotor magnet 5, which would be held in place by a bottom end-plate 3 in the housing 49, the bottom axle 62 fitting with the lower axle indent 61 on the bottom end-plate 3. The rotor 4 is magnetized by the two permanent rotor magnets 1 and 5. The brush 8, commutator 7, and rotor winding 6 below the negative terminal 50 are shown.

Figure 3:
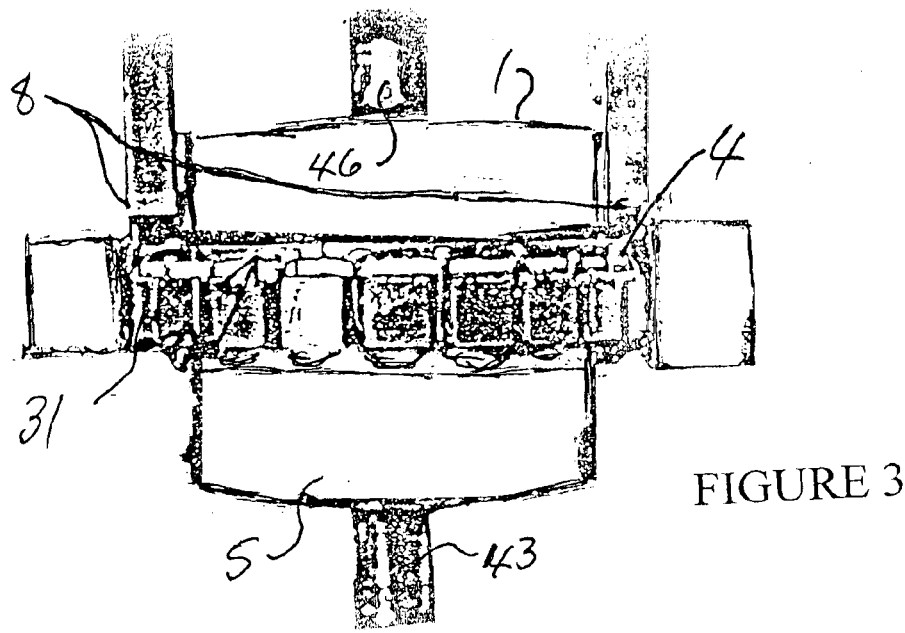
FIG. 3 is a side view of the device of the present invention.

The arrangement of the polarities of the top permanent rotor magnet 1 and the bottom permanent rotor magnet 5 can be seen in FIGS. 1 and 3, with the temporarily north polarity N4 of the rotor 4 located between the north polarity N1 of the top permanent rotor magnet 1 and the north polarity N5 of the bottom permanent rotor magnet 5 on one side of the motor, and the temporarily south polarity S4 of the rotor 4 between the south polarity S1 of the top permanent rotor magnet 1 and the south polarity S5 of the bottom permanent rotor magnet 5 on the opposite side of the motor. Placing the rotor 4 between the top permanent rotor magnet 1 north polarity N1 and the bottom permanent rotor magnet 5 north polarity N5 will magnetize the rotor 4 with a north polarity N4 on that side. The opposite polarizing will occur on the other side of the motor where the rotor 4 is located between the south polarity S1 of the top permanent rotor magnet 1 and the south polarity S5 of the bottom permanent rotor magnet 5. This will magnetize the rotor 4 with a south magnetic polarity S4. The effect is enhanced if the top permanent magnet 1 and the bottom permanent rotor magnet 5 are positioned close to the rotor arms and coils, even to the point that the rotor arm ends such as at 31 and 32, and at 33 and 34 overlap the sides 35 and 36, and the sides 37 and 38 of the permanent rotor magnets 1 and 5 respectively.

Figure 2:
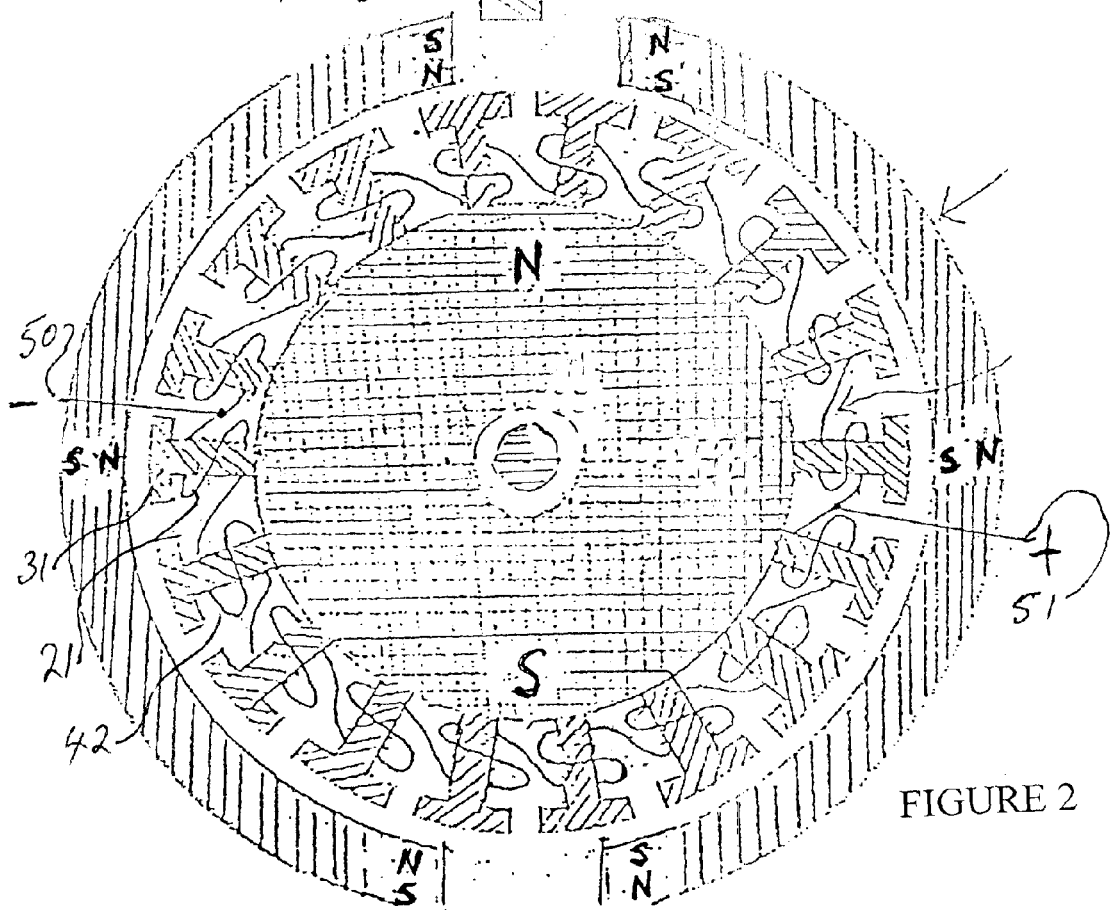
FIG. 2 is a top cross-sectional representation of the device of the present invention.
Figure 4:
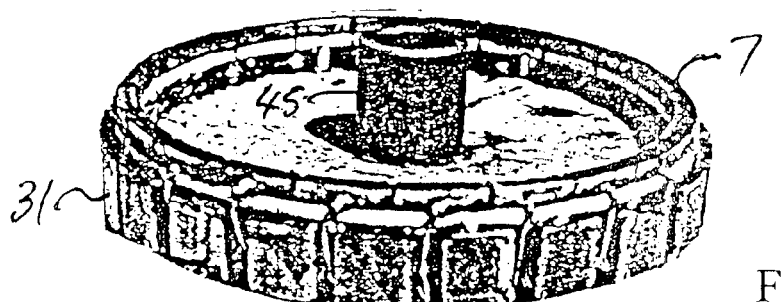
FIG. 4 is a top perspective view of the rotor and commutator ring of the device of FIG. 3.
Figure 5:
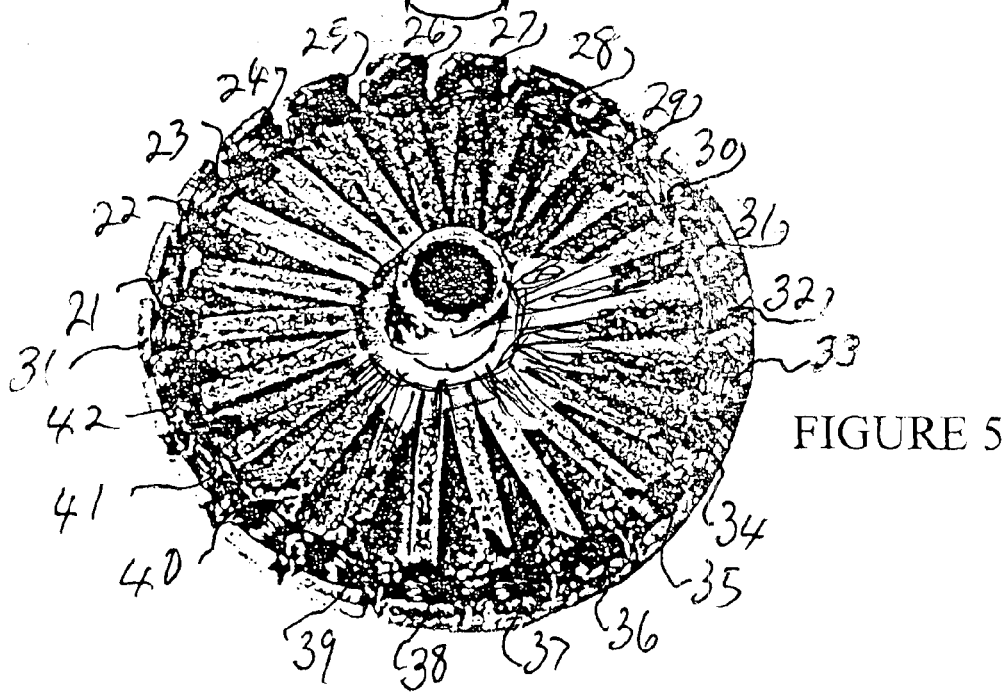
FIG. 5 is a bottom view of the rotor and its coil windings around its rotor arms.

In order for the rotor 4 to turn, the magnetism in the rotor 4 has to be focused. This is accomplished by placing coils 21–42 on the outside of the rotor 4 as seen in FIGS. 2 and 5. The electric polarity in the coils is arranged so as to produce the same magnetic polarity in the rotor 4 as the top and bottom permanent rotor magnets 1 and 5, when electricity is supplied to the coils 21 through 42 in turn via the commutator 7 and brushes 8 shown in FIGS. 4 and 6.

As each section of the rotor 4 passes between the south oriented magnetic polarities S1 and S5 of the top and bottom permanent rotor magnets 1 and 5 the section becomes magnetized with a south oriented magnetic polarity S4. The coil 21 on the rotor 4 supplement and focus the south magnetic polarization S4 in this section of the rotor 4 which is then attracted by the north oriented magnetic polarity N of the permanent field magnets 10 and 11 just as with any electric motor. The opposite polarity attraction effect occurs with the south magnetic polarity S of the permanent field magnets 10 and 11 with respect to the north oriented magnetic polarity S4 after passing between the north poles N1 and N5 of the permanent rotor magnets 1 and 5.

Referring again to FIG. 2, the efficiency effect is enhanced if the faces 28 and 29 of the top permanent rotor magnet 1 and the bottom permanent rotor magnet 5 are positioned close to the rotor arms and coils, with the rotor arm ends as at 31 and 32, and at 33 and 34 overlapping the sides 35 and 36, and the sides 37 and 38 of the permanent rotor magnets 1 and 5 respectively.

Power is supplied via the positive (51) and negative (50) terminals shown on FIGS. 2 and 6. The rotor axle's bottom 46 and top 46 rotate within the bottom permanent rotor magnet hole 44 and within a like hole in the top permanent rotor magnet 1, thereby turning the motor's drive shaft 46.

The within-described invention may be embodied in other specific forms and with additional options and accessories without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalence of the claims are therefore intended to be embraced therein.

I claim:

1. An efficient motor with upper and lower permanent magnets and multiple rotor arm coils comprising in addition to an axle, at least one field magnet surrounding at least in part the rotor in its plane of rotation, commutator bars, brushes, and an armature:

a) a top permanent magnet held in place above a rotor, and a bottom permanent magnet held in place below the rotor, the rotor being rotatable on an axle aligned with a central axis of the top permanent magnet and of the bottom permanent magnet, by which sections of the rotor are in turn magnetized with a polarity matching the top-to-bottom aligned polarity of the top and bottom permanent magnets;

b) individual inductive wire coils wound around a portion of a plurality of rotor arms radiating from a rotor axle, the portion being adjacent to an end of each respective rotor arm, the coils being arranged as in an armature of a direct current electric motor, electrified through a commutator and brushes such that the coils produce the same magnetic polarity in the rotor overall as is produced in the rotor by the top and bottom permanent magnets;

whereby the amount of electricity required to run the motor is less than if it comprised just the axle, the field magnet, the commutator bars, the brushes, and the armature.

2. The efficient motor with upper and lower permanent magnets and multiple rotor arm coils of claim 1, in which the top permanent magnet and the bottom permanent magnet are cylindrical, and the axle of the motor extends at least partially through a cylindrical axis of each such permanent magnet.

3. The efficient motor with upper and lower permanent magnets and multiple rotor arm coils of claim 1, in which a) as each section of the rotor passes between south oriented magnetic polarities of the top and bottom permanent rotor magnets, that section becomes magnetized with a south oriented magnetic polarity, and the corresponding coil on the rotor supplements and focuses the south magnetic polarization, which is then attracted by the north oriented magnetic polarity of the permanent field magnets, and b) as each section of the rotor passes between north south oriented magnetic polarities of the top and bottom permanent rotor magnets, that section becomes magnetized with a north oriented magnetic polarity, and the corresponding coil on the rotor supplements and focuses the north magnetic polarization, which is then attracted by the south oriented magnetic polarity of the permanent field magnets.

4. The efficient motor with upper and lower permanent magnets and multiple rotor arm coils of claim 1, in which approximately twenty-two arms form the rotor in an equidistant radiant formation.

5. The efficient motor with upper and lower permanent magnets and multiple rotor arm coils of claim 1, in which faces of the top permanent magnet and the bottom permanent rotor magnet are positioned close to the rotor arms and coils, and end portions of the rotor arms extend past sides of the top and bottom permanent rotor magnets respectively.

6. The efficient motor with upper and lower permanent magnets and multiple rotor arm coils of claim 1, in which the top permanent magnet is held in place by a top end-plate of a housing for the motor and the bottom permanent magnet is held in place by a bottom end-plate of the housing, and fine adjustments of the top and bottom permanent rotor magnets can be made by screwing the top and bottom end-plates which are threadably inserted in the housing.

7. The efficient motor with upper and lower permanent magnets and multiple rotor arm coils of claim 2, in which:
   a) as each section of the rotor passes between south oriented magnetic polarities of the top and bottom permanent rotor magnets, that section becomes magnetized with a south oriented magnetic polarity, and the corresponding coil on the rotor supplements and focuses the south magnetic polarization, which is then attracted by the north oriented magnetic polarity of the permanent field magnets;
   b) as each section of the rotor passes between north south oriented magnetic polarities of the top and bottom permanent rotor magnets, that section becomes magnetized with a north oriented magnetic polarity, and the corresponding coil on the rotor supplements and focuses the north magnetic polarization, which is then attracted by the south oriented magnetic polarity of the permanent field magnets;
   c) approximately twenty-two arms form the rotor in an equidistant radiant formation;
   d) faces of the top permanent magnet and the bottom permanent rotor magnet are positioned close to the rotor arms and coils, and end portions of the rotor arms extend past sides of the top and bottom permanent rotor magnets respectively;
   e) the top permanent magnet is held in place by a top end-plate of a housing for the motor and the bottom permanent magnet is held in place by a bottom end-plate of the housing, and fine adjustments of the top and bottom permanent rotor magnets can be made by screwing the top and bottom end-plates which are threadably inserted in the housing.

* * * * *